United States Patent
Chen et al.

(10) Patent No.: US 9,198,159 B2
(45) Date of Patent: Nov. 24, 2015

(54) TRANSMISSION METHOD AND APPARATUS FOR NON-PERIODIC SOUNDING REFERENCE SIGNAL(SRS)

(75) Inventors: Wenhong Chen, Beijing (CN); Rakesh Tamrakar, Beijing (CN); Guojun Xiao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 194 days.

(21) Appl. No.: 13/704,242

(22) PCT Filed: May 17, 2011

(86) PCT No.: PCT/CN2011/074186
§ 371 (c)(1),
(2), (4) Date: Mar. 8, 2013

(87) PCT Pub. No.: WO2011/150742
PCT Pub. Date: Dec. 8, 2011

(65) Prior Publication Data
US 2013/0201971 A1    Aug. 8, 2013

(30) Foreign Application Priority Data
May 31, 2010    (CN) .......................... 2010 1 0195422

(51) Int. Cl.
*H04W 4/00* (2009.01)
*H04W 72/02* (2009.01)
*H04W 72/04* (2009.01)

(52) U.S. Cl.
CPC ............ *H04W 72/02* (2013.01); *H04W 72/042* (2013.01)

(58) Field of Classification Search
None
See application file for complete search history.

(56) References Cited

U.S. PATENT DOCUMENTS

2010/0246561 A1* 9/2010 Shin et al. .................... 370/345
2011/0268028 A1* 11/2011 Stern-Berkowitz et al. .. 370/328

FOREIGN PATENT DOCUMENTS

CN    101572945 A    11/2009
CN    101702631 A    5/2010

(Continued)

OTHER PUBLICATIONS

ISR and WO for related PCT/CN2011/074186 mailed on Aug. 25, 2011.

(Continued)

*Primary Examiner* — Yemane Mesfin
*Assistant Examiner* — Jeff Banthrongsack
(74) *Attorney, Agent, or Firm* — Ladas & Parry, LLP

(57) ABSTRACT

The present invention discloses a transmission method and apparatus for non-periodic SRS. eNB configures time-domain configuration parameter of non-periodic SRS through higher layer signalling or downlink physical control channel signalling; terminal equipment transmits non-periodic SRS in indicated time-domain resource. The application of the technical solution of the embodiments of the present invention can reduce signalling consumption through high layer semi-static configuration of time-domain resource of non-periodic SRS. On one hand, flexible non-periodic SRS time-domain transmission is allowed for terminal equipment which can send non-periodic SRS in multiple subframes, which is featured by low sounding delay and great sounding bandwidth; on the other hand, flexible timing mode is also permitted for terminal equipment which brings little restriction to scheduling.

10 Claims, 2 Drawing Sheets

(56) References Cited

FOREIGN PATENT DOCUMENTS

| CN | 102104973 A | 6/2011 |
|---|---|---|
| WO | 2009022866 A1 | 2/2009 |

OTHER PUBLICATIONS

IPRP for related PCT/CN2011/074186 issued on Dec. 4, 2012 and its English translation.

CATT, Potevio, Aperiodic SRS Transmission in LTE-A[online], 3GPP TSG-RAN WG1#61 R1-102661, May 14, 2010.

Texas Instruments, Design Considerations for Aperiodic SRS[online], 3GPP TSG-RAN WG1#60b, R1-102110, Apr. 16, 2010.

Motorola, LTE-A Dynamic Aperiodic SRS-Triggering, Duration, Timing, and Carrier Aggregation[online], 3GPP TSG-RAN WG1#61, R1-103187, May 14, 2010.

Motorola, Views on SRS Enhancements for LTE-A[online], 3GPP TSG-RAN WG1#60b, R1-102142, Apr. 16, 2010.

Office action dated Jan. 14, 2013 from corresponding Chinese Patent Application No. 201010195422.0 and its English translation from the applicants.

Office action dated Dec. 23, 2013 from corresponding Japanese Patent Application No. 2013-512738 and its English translation from the applicants.

Office action dated Mar. 14, 2014 from corresponding Korean Patent Application No. 10-2012-702367 and its English translation from the applicants.

* cited by examiner

TRANSMISSION METHOD AND APPARATUS FOR NON-PERIODIC SOUNDING REFERENCE SIGNAL(SRS)

CROSS REFERENCE TO RELATED APPLICATIONS

This application is the U.S. national stage of international patent application no. PCT/CN2011/074186 filed on May 17, 2011, which claims priority to Chinese patent application no. 201010195422.0 entitled "Transmission Method and Apparatus For Non-periodic Sounding Reference Symbol(SRS)" filed in the patent office of the People's Republic of China on May 31, 2010, the disclosures of which are incorporated by reference herein in their entireties.

FIELD OF THE INVENTION

The present invention relates to the field of communication technology, in particular to the transmission method and apparatus for non-periodic SRS.

BACKGROUND OF THE INVENTION

In current system, uplink channel is detected relying on sounding symbol. eNB can acquire uplink channel information by the way that terminal equipment sends sounding symbol at the last symbol of SRS subframe, so as to schedule and measure resource transmitted through uplink, including measurement of RI (Rank Indication)/PMI (Precoding Matrix Indicator)/CQI (Channel Quality Indication), etc. SRS in LTE (Long Term Evolution) system is sent periodically, that is, terminal equipment will send sounding symbol continuously based on certain periodicity till entering the state of no data transmission. Parameters of periodic SRS are all configured through higher layer, including CS (Cycle Shift), bandwidth, frequency hopping parameter, periodicity, subframe sending position, etc. of SRS.

Owing to long scheduling periodicity and low scheduling efficiency, periodic SRS often occupies much more physical resources. Especially in LTE-A (Long Term Evolution Advanced) system, UE (User Apparatus) often requires sending SRS of multiple antennas at the same time, thus resulting in more resource consumption. To improve SRS resource utilization rate and reduce consumption of SRS resource, non-periodic SRS transmission is introduced in LTE-A system. Differing from periodic SRS, non-periodic SRS is dynamically activated by eNB. Once activating non-periodic SRS, terminal equipment will only send one-off sounding symbol, but not the periodic sounding symbol. eNB can acquire the required channel information more flexibly upon non-periodic sounding and it can reduce consumption of physical resource of SRS if closing or reducing transmission of periodic SRS when conditions permit.

Both periodic SRS and non-periodic SRS are transmitted above dedicated SRS subframe of cell, so it is necessary to solve the problem on how to schedule non-periodic SRS resource to provide adequate physical resource and ensure there is no resource conflict occurring to periodic SRS. Meanwhile, terminal equipment can transmit SRS in a more flexible mode after receiving parameter configuration and activation signalling of eNB. In present technologies, dedicated DCI format (Downlink Control Indicator format) for SRS is introduced in PDCCH (Physical Downlink Control Channel) to configure parameter of non-periodic SRS and share the same length with other uplink formats (such as format0) for multiplexing, thus realizing dynamic resource configuration. Both frequency-domain configuration and time-domain subframe configuration of non-periodic SRS are included in DCI format. Terminal equipment can conduct non-periodic SRS transmission in time frequency resource that controls signalling indicator after receiving control signalling sent by eNB. Another solution is to activate non-periodic SRS only with 1 bit signalling in UL grant or DL grant, and transmission parameters of both time-domain and frequency-domain are indicated through higher layer signalling.

During implementation of the embodiments of the present invention, the applicant finds that the following problems exist in the available technology at least:

Configuration of non-periodic SRS by introducing dedicated DCI format of SRS in present technology will greatly increase resource consumption of PDCCH, even waste PDCCH resource to certain extent due to less configuration bit. There will be great resource consumption if many users are activated, thus making PDCCH unaffordable.

SUMMARY OF THE INVENTION

The embodiments of the present invention provide a transmission method and apparatus for non-periodic SRS. eNB configures time-domain configuration parameter of non-periodic SRS through higher layer signalling or PDCCH signalling, and terminal equipment conducts non-periodic transmission in time-domain resource indicated.

To achieve the purpose, embodiments of the present invention provide a transmission method for non-periodic SRS (sounding reference symbol), including:

Terminal equipment receives time-domain configuration parameter of non-periodic SRS sent by eNB through higher layer signalling or PDCCH signalling;

After the terminal equipment receives the non-periodic SRS activation signalling sent by the eNB, the terminal equipment selects corresponding time-domain resource to send non-periodic SRS to the eNB in accordance with the time-domain configuration parameter of non-periodic SRS.

Besides, the embodiments of the present invention also provide a terminal equipment, including:

Reception module, which is used to receive the time-domain configuration parameter of non-periodic SRS sent by eNB through higher layer signalling or PDCCH signalling and non-periodic SRS activation signalling sent by the eNB.

Sending module, which is used to select corresponding time-domain resource to send non-periodic SRS to the eNB in accordance with the time-domain configuration parameter of non-periodic SRS received by the reception module after the reception module receives the non-periodic SRS activation signalling sent by the eNB.

Besides, the embodiments of the present invention also provide a transmission method for non-periodic SRS, including:

The eNB will send time-domain configuration parameter of non-periodic SRS to terminal equipment through higher layer signalling or PDCCH signalling;

If the eNB sends non-periodic SRS activation signalling to the terminal equipment, the eNB will receive the non-periodic SRS sent by time-domain resource selected by the terminal equipment in accordance with the time-domain configuration parameter of the non-periodic SRS.

Besides, the embodiments of the present invention also provide an eNB, including:

Sending module, which is used to send time-domain configuration parameter of non-periodic SRS to terminal equipment through higher layer signalling or PDCCH signalling, and send non-periodic SRS activation signalling to the terminal equipment;

Reception module, which is used to receive the non-periodic SRS sent by time-domain resource selected by the terminal equipment in accordance with the time-domain configuration parameter of the non-periodic SRS after the sending module sends non-periodic SRS activation signalling to the terminal equipment.

Compared with available technology, the embodiments of the present invention have the following advantages:

Application of the technical solution of the embodiments of the present invention can reduce signalling consumption relying on high-layer semi-static configuration of time-domain resource of non-periodic SRS. On one hand, flexible non-periodic SRS time-domain transmission is allowed for terminal equipment which can send non-periodic SRS in multiple subframes, which is featured by low sounding delay and great sounding bandwidth; on the other hand, flexible timing mode is also permitted for terminal equipment which brings little restriction to scheduling.

DETAILED DESCRIPTION OF THE EMBODIMENTS OF THE PRESENT INVENTION

In LTE-A system, periodic SRS (Sounding Reference Signal) requires occupying much more physical resources due to the introduction of multiple antenna transmission. To improve SRS resource utilization rate and reduce consumption of SRS resource, non-periodic SRS transmission is introduced in LTE-A system to activate one-off sounding through dynamic scheduling.

It is necessary to solve the problem on how to conduct time-domain resource scheduling of non-periodic SRS and send non-periodic SRS by terminal equipment after receiving signalling from eNB in right way.

The embodiments of the present invention provide a transmission method for non-periodic SRS. eNB configures time-domain parameter of non-periodic SRS through higher layer signalling or PDCCH signalling, and terminal equipment conducts SRS transmission based on the configuration, which can reasonably and effectively schedule and transmit time-domain resource of non-periodic SRS.

To solve the problem existing in current technology, embodiments of the present invention provide a transmission method for non-periodic SRS in consideration of compatible LTE system.

The embodiments of the present invention provide a transmission method for non-periodic SRS, including that eNB informs terminal equipment the parameter configuration of non-periodic SRS through higher layer signalling or PDCCH signalling, and terminal equipment conducts flexible non-periodic SRS transmission based on the parameter configuration.

Implementation of UE and eNB side as well as the cooperation of the both will be described; however, it does not mean the two must be implemented in cooperation. In fact, when UE and eNB are implemented separately, the problems existing in UE and eNB sides are solved. Application of the two in combination will acquire better technical effects.

Figure 1:
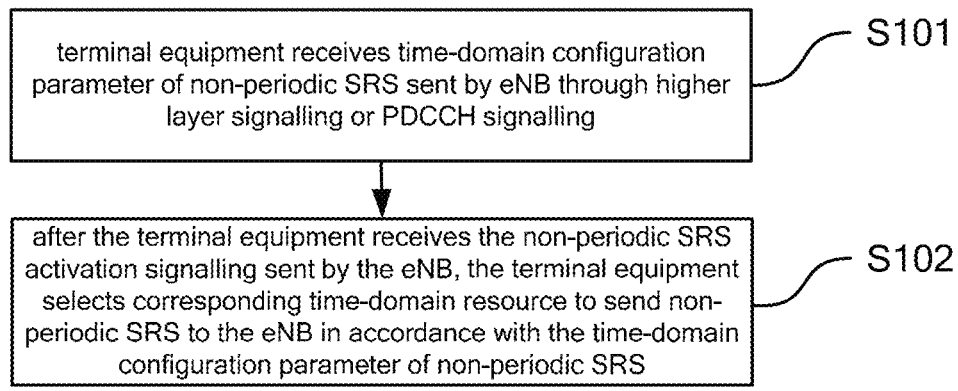
FIG. 1 is a flow diagram of transmission method for non-periodic SRS at terminal equipment side provided by embodiments of the present invention.

As shown in FIG. 1, a flow diagram of transmission method for non-periodic SRS is provided in embodiments of the present invention, and the method comprises the following steps:

Step 101, terminal equipment receives time-domain configuration parameter of non-periodic SRS sent by eNB through higher layer signalling or PDCCH signalling.

Herein, configuration parameter of non-periodic SRS specifically comprises:

(1) Configuration information of time-domain resource configuration periodicity for non-periodic SRS, which can be divided into the following conditions:

Condition I, hidden indication information, viz. the configuration information indicating the preset time-domain resource configuration periodicity applied by terminal equipment.

In this condition, it is required to preset a specific time-domain resource configuration periodicity for both terminal equipment and eNB, based on which, the time-domain resource configuration periodicity applied by terminal equipment can be informed according to indication information default or other parameter values that can represent the hidden indication information.

Condition II, dominant indication information, viz. the configuration information clearly indicating the time-domain resource configuration periodicity value applied by terminal equipment.

Such indication information requires occupying corresponding resource space, so it can be predetermined that terminal equipment acquires corresponding indication information in corresponding resource space.

Condition III, Configuration information associated with that of subframe.

Clear correspondence exists in such joint information so as to facilitate terminal equipment to acquire corresponding configuration information.

(2) Subframe configuration information of non-periodic SRS, which can be divided into the following conditions specifically:

Condition I, continuous indicator, viz. clearly pointing out the starting information and continuous length information of subframe resource applied by terminal equipment.

Terminal equipment can clearly acquire which subframe resources are the ones configured for itself through this indication.

Condition II, discrete indicator, viz. the information indicating whether one or several subframe(s) is (are) used for non-periodic SRS transmission of terminal equipment.

Thus it can indicate whether one or several subframe(s) is (are) the subframe sources configured for terminal equipment in designated resource through clear indication information.

Condition III, configuration information jointed with the configuration information of time-domain resource configuration periodicity.

Clear correspondence exists in such joint information so as to facilitate terminal equipment to acquire corresponding configuration information.

Step 102, after the terminal equipment receives the non-periodic SRS activation signalling sent by the eNB, the terminal equipment selects corresponding time-domain resource to send non-periodic SRS to the eNB in accordance with the time-domain configuration parameter of non-periodic SRS.

Transmission strategy can be divided into the following conditions during implementation:

Strategy I, after receiving the non-periodic SRS activation signalling sent by the eNB, the terminal equipment sends non-periodic SRS directly on all configuration subframes within a time-domain resource configuration periodicity after several subframes in accordance with the configuration parameter of non-periodic SRS.

Strategy II, after receiving the non-periodic SRS activation signalling sent by the eNB, the terminal equipment determines to send non-periodic SRS on the first configuration subframe or all configuration subframes within a time-domain resource configuration periodicity after several subframes in accordance with the duration configuration information of non-periodic SRS carried in higher layer signalling or PDCCH signalling.

The processing flow abovementioned is the one of transmission method for non-periodic SRS put forward by the embodiments of the invention at terminal equipment side, correspondingly, the embodiments of the invention also provide the implementation flow at eNB side.

Figure 2:
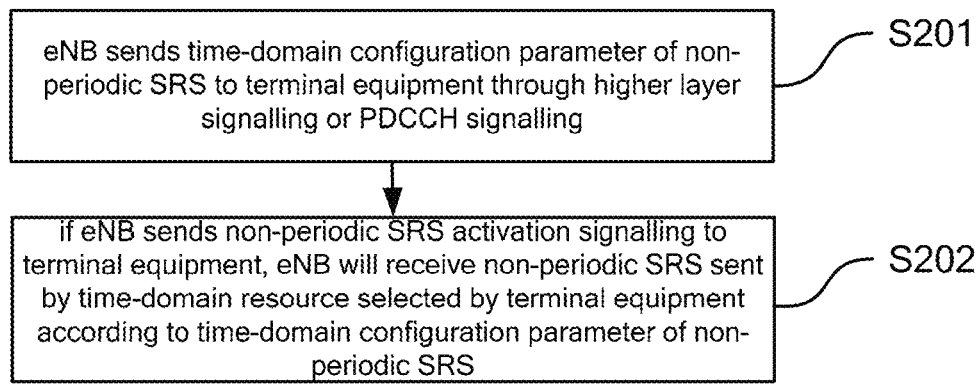
FIG. 2 is a flow diagram of transmission method for non-periodic SRS at eNB side provided by embodiments of the present invention.

As shown in FIG. 2, a flow diagram of transmission method for non-periodic SRS at eNB side is provided in embodiments of the present invention, and the method comprises the following steps:

Step 201, eNB sends time-domain configuration parameter of non-periodic SRS to terminal equipment through higher layer signalling or PDCCH signalling.

Herein, please refer to the description in Step 101 for time-domain configuration parameter of non-periodic SRS, and it will not be described hereby.

Step 202, if eNB sends non-periodic SRS activation signalling to terminal equipment, eNB will receive non-periodic SRS sent by time-domain resource selected by terminal equipment according to time-domain configuration parameter of non-periodic SRS.

Corresponding to the two transmission strategies in the Step 102, specific flow of the step is as follows:

After sending non-periodic SRS activation signalling to terminal equipment, eNB receives non-periodic SRS sent directly on all configuration subframes within a time-domain resource configuration periodicity after several subframes by terminal equipment in accordance with the configuration parameter of non-periodic SRS; or, After sending non-periodic SRS activation signalling to terminal equipment, eNB receives non-periodic SRS sent on the first configuration subframe or all configuration subframes within a time-domain resource configuration periodicity after several subframes by terminal equipment in accordance with the duration configuration information of non-periodic SRS carried in higher layer signalling or PDCCH signalling.

It can be seen from the embodiments that compared with present technology, embodiments of the present invention at least have the following advantages:

The application of the technical solution of the embodiments of the present invention can reduce signalling consumption through high-level semi-static configuration of time-domain resource of non-periodic SRS. On one hand, flexible non-periodic SRS time-domain transmission is allowed for terminal equipment which can send non-periodic SRS in multiple subframes, which is featured by low sounding delay and great sounding bandwidth; on the other hand, flexible timing mode is also permitted for terminal equipment which brings little restriction to scheduling.

The technical solution put forward by the embodiments of the present invention will be explained in combination with specific implementation scene.

Implementation flow at terminal equipment side shall be taken as the example for easy description as below, so is the eNB side. It will not be described hereby, which will not affect the protection scope of the present invention.

Figure 3:
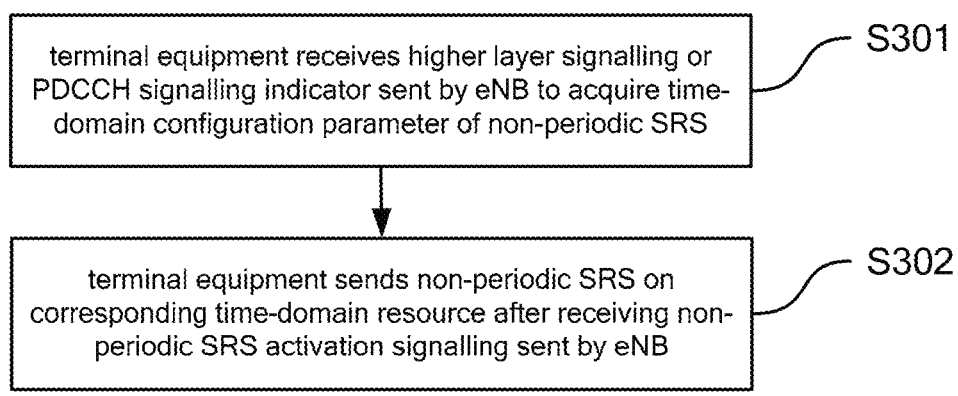
FIG. 3 is a flow diagram of transmission method for non-periodic SRS under specific application scene provided by embodiments of the present invention.

As shown in FIG. 3, a flow diagram of transmission method for non-periodic SRS under specific application scene is provided by embodiments of the present invention, and the method comprises the following steps:

Step 301, terminal equipment receives higher layer signalling or PDCCH signalling indicator sent by eNB to acquire time-domain configuration parameter of non-periodic SRS, which at least comprises:

(1) Configuration information of time-domain resource configuration periodicity for non-periodic SRS, which can be divided into three indication modes:

Mode I, hidden indication mode, taking the set fixed periodicity as time-domain resource configuration periodicity of non-periodic SRS.

For example, both terminal equipment and eNB are set to take 10 ms as time-domain resource configuration periodicity of non-periodic SRS.

Mode II, dominant indication mode, independently indicating the configuration periodicity of time-domain resource for transmitting non-periodic SAR with several bits.

For example, configuration periodicity of time-domain resource used for transmitting non-periodic SRS is indicated by indication information carried in 1 bit in higher layer signalling or PDCCH signalling to be 10 ms or 20 ms.

Mode III, indication mode similar to that of periodic SRS to indicate jointly with subframe configuration.

Explanation through two specific embodiments is made as below:

Embodiment I: every user is allowed to configure only one non-periodic SRS subframe and two different time-domain periodicitys. Refer to Table 1 for specific configuration indication:

TABLE 1

| Indication index (Isrs) | Configuration periodicity | Subframe index |
|---|---|---|
| 0-9 | 10 ms | Isrs |
| 10-29 | 20 ms | Isrs-10 |
| 30-32 | Reserve | |

Embodiment II: every user is allowed to configure two non-periodic SRS subframes and a time-domain periodicitys. Refer to Table 2 for specific configuration indication:

TABLE 2

| Indication index (Isrs) | Configuration periodicity | Subframe index |
|---|---|---|
| 0-9 | 10 ms | Isrs |
| 10-18 | 10 ms | (0, Isrs-9) |
| ... | ... | ... |
| 52-53 | 10 ms | (7, Isrs-44) |
| 54 | 10 ms | (8, Isrs-45) |

(2) Subframe configuration information of non-periodic SRS, which can be divided into three indication modes:

Mode I, continuous indication mode, independently indicating initial position index and continuous length (viz. the continuous subframe number) of subframe resource.

For example, indicate 10 possible initial subframes position with 4 bits in higher layer signalling or PDCCH signalling, then indicate 1-4 possible continuous subframes number with 2 bits.

Mode II, discrete indication mode, indicating whether each subframe can be used for transmitting non-periodic SRS of user in bitmap mode;

For example, indicate whether the 10 subframes can be used for transmitting non-periodic SRS of the user respectively with 10 bits in higher layer signalling or PDCCH signalling. If the subframe is used for transmitting non-periodic SRS, the corresponding bit is 1, otherwise, it is 0.

For example, 1000001010 represents that the $1^{st}$, $7^{th}$ and $9^{th}$ subframes can be used for transmitting non-periodic SRS.

Mode III, the indication mode similar to that of periodic SRS for indicating jointly with configuration periodicity of time-domain resource.

Specific embodiments are similar to those in the Table 1 and Table 2, and will not be described hereby.

Step 302, terminal equipment sends non-periodic SRS on corresponding time-domain resource after receiving non-periodic SRS activation signalling sent by eNB.

It can be treated in the following two modes in specific application scene:

Mode I, after receiving activation signalling, the terminal equipment transmits non-periodic SRS on all configuration subframes within a time-domain resource configuration periodicity after several subframes.

Mode II, terminal equipment receives non-periodic SRS duration configuration indicated by eNB through higher layer, and decides to send non-periodic SRS only on a configuration subframe or transmit non-periodic SRS on all configuration subframes in a time-domain configuration periodicity after several subframes.

It shall be further noted that technical solution provided by embodiments of the present invention is extensively applied. It can be used for uplink transmission with any antenna quantity and array (such as linear array, polarization array) in any duplexing system (TDD (Time Division Duplex) or FDD (Frequency Division Duplex) system), and in any sending mode (such as SU-MIMO (Single Users-MIMO), MIMO (Multiple Input Multiple Output), MU-MIMO (MultipleUsers-MIMO), CoMP (Coordinated multi-point transmission/reception), etc.

Based on the same inventive concept, embodiments of the present invention also provide a terminal equipment and eNB. Since the principle of these apparatuss to solve problem is similar to the transmission method for non-periodic SRS (sounding reference signal), these sets of apparatus shall be implemented with reference to the implementation of the method, which will not be described again hereby.

Figure 4:
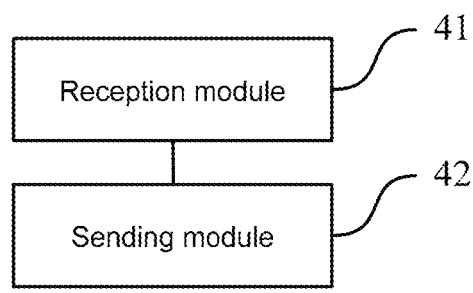
FIG. 4 is a structural diagram of terminal equipment provided by embodiments of the present invention.

The embodiments of the present invention also provide a terminal equipment, structural diagram of which is shown in FIG. 4, further including:

Reception module 41, which is used to receive the time-domain configuration parameter of non-periodic SRS sent by eNB through higher layer signalling or PDCCH signalling, as well as non-periodic SRS activation signalling sent by the eNB.

Specifically, non-periodic SRS configuration parameter received by reception module 41 comprises configuration information of time-domain resource configuration periodicity and subframe configuration information of non-periodic SRS.

Herein, configuration information of time-domain resource configuration periodicity of non-periodic SRS refers to:

Configuration information indicating the preset time-domain resource configuration periodicity applied by terminal equipment; or, Configuration information indicating the time-domain resource configuration periodicity value applied by terminal equipment; or, Configuration information associated with that of subframe;

Subframe configuration information of non-periodic SRS refers to:

Starting information and continuous length information of subframe resource applied by terminal equipment; or, Information indicating whether one or several subframe(s) is (are) used for non-periodic SRS transmission of terminal equipment; or, Configuration information associated with that of time-domain resource configuration periodicity.

Sending module 42, which is used to select corresponding time-domain resource and send non-periodic SRS to the eNB in accordance with the time-domain configuration parameter of non-periodic SRS received by the reception module 41 after the reception module 41 receives the non-periodic SRS activation signalling sent by the eNB. The module will be treated in following two conditions under specific application scene:

After reception module 41 receives the non-periodic SRS activation signalling sent by the eNB, the sending module 42 sends non-periodic SRS directly on all configuration subframes within a time-domain resource configuration periodicity after several subframes in accordance with the configuration parameter of non-periodic SRS; or, After reception module 41 receives the non-periodic SRS activation signalling sent by the eNB, the sending module 42 determines to send non-periodic SRS on the first configuration subframe or all configuration subframes within a time-domain resource configuration periodicity after several subframes in accordance with the duration configuration information of non-periodic SRS carried in higher layer signalling or PDCCH signalling.

Figure 5:
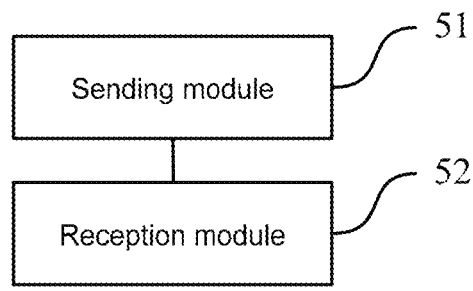
FIG. 5 is a structural diagram of eNB provided by embodiments of the present invention.

Accordingly, embodiments of the present invention also provide an eNB, whose the structural diagram is shown in FIG. 5, including:

Sending module 51, which is used to send time-domain configuration parameter of non-periodic SRS to terminal equipment through higher layer signalling or PDCCH signalling, and send non-periodic SRS activation signalling to terminal equipment.

Herein, the time-domain configuration parameter of non-periodic SRS is similar to the aforethe one, and it will not be described hereby.

Reception module 52, which is used to receive the non-periodic SRS sent by time-domain resource selected by the terminal equipment in accordance with the time-domain configuration parameter of the non-periodic SRS after sending module 51 sends non-periodic SRS activation signalling to the terminal equipment.

Corresponding to invention mode of the terminal equipment, receiving mode for this module is divided into the following conditions:

After sending module 51 sends the non-periodic SRS activation signalling to terminal equipment, reception module 52 receives non-periodic SRS sent by terminal equipment directly on all configuration subframes within a time-domain resource configuration periodicity after several subframes in accordance with the configuration parameter of non-periodic SRS; or, After sending module 51 sends the non-periodic SRS activation signalling to terminal equipment, reception module 52 receives non-periodic SRS on the first configuration subframe or all configuration subframes within a time-domain resource configuration periodicity after several subframes in accordance with the duration configuration information of non-periodic SRS carried in higher layer signalling or PDCCH signalling.

Through the description of implementation mode aforethe, technician of the field can clearly understand that embodiments of the present invention can be realized through hardware or software and necessary universal hardware platform. Accordingly, technical solution in embodiments of the present invention can be embodied in form of software product which can be stored in a non-volatile memory medium (CD-ROM, USB flash disc, Mobile HD, etc.), including several instructions to enable one computer apparatus (personal computer, server or network apparatus, etc.) to implement the method mentioned in all implementation scenes in embodiments of the present invention.

Technician of the field can understand that attached figure is just a schematic diagram of preferred implementation scene; module or flow in the attached figure is not necessary to implement embodiments of the present invention.

Technician of the field can understand that modules in device in implementation scene can be distributed in devices of implementation scene according to its description, and also can be distributed in one or many devices that are different from the implementation scene. Modules in the implementation scene can be combined as one module, or further dismantled into several sub-modules.

The number of the aforementioned embodiments of the present invention is only for the purpose of description rather than representing advantages or disadvantages.

The open scenes aforethe are only several specific implementation scenes in embodiments of the present invention and the present invention is not limited to it. All possible changes put forth by any technician of the field shall be included into the service restriction scope of embodiments of the present invention.

The invention claimed is:

1. A transmission method for non-periodic Sounding Reference Symbol (SRS), comprising:
 a terminal equipment receiving time-domain configuration parameter of non-periodic SRS sent by eNB through higher layer signalling or Physical Downlink Control Channel (PDCCH) signalling;
 after receiving the non-periodic SRS activation signalling sent by the eNB, the terminal equipment selecting corresponding time-domain resource to send non-periodic SRS to the eNB in accordance with the time-domain configuration parameter of the non-periodic SRS, wherein
 sending non-periodic SRS directly on all configuration subframes within a time-domain resource configuration periodicity after several subframes in accordance with the configuration parameter of non-periodic SRS, or
 determining to send non-periodic SRS on all configuration subframes within a time-domain resource configuration periodicity after several subframes in accordance with the duration configuration information of non-periodic SRS carried in higher layer signalling or PDCCH signalling.

2. The method as claimed in claim 1, wherein the non-periodic SRS configuration parameter comprises:
 configuration information of time-domain resource configuration periodicity of non-periodic SRS; and/or
 subframe configuration information of non-periodic SRS.

3. The method as claimed in claim 2, wherein the configuration information of time-domain resource configuration periodicity of the non-periodic SRS is as follows:
 configuration information indicating the preset time-domain resource configuration periodicity applied by terminal equipment; or
 configuration information indicating the time-domain resource configuration periodicity value applied by terminal equipment; or
 configuration information associated with that of subframe.

4. The method as claimed in claim 2, wherein, the subframe configuration information of the non-periodic SRS is as follows:
 starting information and continuous length information of subframe resource applied by the terminal equipment; or
 information indicating whether one or several subframes are used by the terminal equipment for non-periodic SRS transmission; or
 configuration information associated with that of time-domain resource configuration periodicity.

5. A terminal equipment, comprising:
 a reception module, configured to receive time-domain configuration parameter of non-periodic SRS sent by eNB through higher layer signalling or PDCCH signalling;
 a sending module, configured to select corresponding time-domain resource to send non-periodic SRS to the eNB in accordance with the time-domain configuration parameter of non-periodic SRS received by the reception module after the reception module receives the non-periodic SRS activation signalling sent by the eNB; wherein
 after the reception module receives the non-periodic SRS activation signalling sent by the eNB, the sending module sends non-periodic SRS directly on all configuration subframes within a time-domain resource configuration periodicity after several subframes in accordance with the configuration parameter of non-periodic SRS; or
 after the reception module receives the non-periodic SRS activation signalling sent by the eNB, the sending module determines to send non-periodic SRS on all configuration subframes within a time-domain resource configuration periodicity after several subframes in accordance with the duration configuration information of non-periodic SRS carried in higher layer signalling or PDCCH signalling.

6. The terminal equipment as claimed in claim 5, wherein non-periodic SRS configuration parameter received by the reception module comprises configuration information of time-domain resource configuration periodicity and/or subframe configuration information of non-periodic SRS:
 wherein the configuration information of time-domain resource configuration periodicity of the non-periodic SRS is specifically as follows:
 configuration information indicating the preset time-domain resource configuration periodicity applied by terminal equipment; or configuration information indicating the time-domain resource configuration periodicity value applied by terminal equipment; or configuration information associated with that of subframe;

the subframe configuration information of the non-periodic SRS is specifically as follows:

starting information and continuous length information of subframe resource applied by the terminal equipment; or information indicating whether one or several subframes are used by the terminal equipment for non-periodic SRS transmission; or configuration information associated with that of time-domain resource configuration periodicity.

7. A transmission method for non-periodic SRS, comprising:

an eNB sending time-domain configuration parameter of non-periodic SRS to terminal equipment through higher layer signalling or PDCCH signalling;

when the eNB sending non-periodic SRS activation signalling to the terminal equipment, the eNB receiving the non-periodic SRS sent by time-domain resource selected by the terminal equipment in accordance with the time-domain configuration parameter of the non-periodic SRS; wherein after sending non-periodic SRS activation signalling to the terminal equipment, the eNB receiving non-periodic SRS sent directly on all configuration subframes within a time-domain resource configuration periodicity after several subframes by the terminal equipment in accordance with the configuration parameter of non-periodic SRS; or after sending non-periodic SRS activation signalling to the terminal equipment, the eNB receiving non-periodic SRS sent on all configuration subframes within a time-domain resource configuration periodicity after several subframes by terminal equipment in accordance with the duration configuration information of non-periodic SRS carried in higher layer signalling or PDCCH signalling.

8. The method as claimed in claim 7, wherein the non-periodic SRS configuration parameter comprises:

configuration information of time-domain resource configuration periodicity of non-periodic SRS; and/or subframe configuration information of non-periodic SRS.

9. The method as claimed in claim 8, wherein the configuration information of time-domain resource configuration periodicity for the non-periodic SRS is as follows:

configuration information indicating the preset time-domain resource configuration periodicity applied by terminal equipment; or configuration information indicating the time-domain resource configuration periodicity value applied by terminal equipment; or configuration information associated with that of subframe.

10. The method as claimed in claim 8, wherein the subframe configuration information of the non-periodic SRS is as follows:

starting information and continuous length information of subframe resource applied by the terminal equipment; or information indicating whether one or several subframes are used by the terminal equipment for non-periodic SRS transmission; or configuration information associated with that of time-domain resource configuration periodicity.

* * * * *